Aug. 16, 1927.

A. M. TAYLOR 1,639,473

ELECTRIC POWER TRANSMISSION

Filed Sept. 27, 1926

Inventor
Alfred Mills Taylor
By Harold C. Thorne
His Attorney

Patented Aug. 16, 1927.

1,639,473

UNITED STATES PATENT OFFICE.

ALFRED MILLS TAYLOR, OF ERDINGTON, BIRMINGHAM, ENGLAND.

ELECTRIC-POWER TRANSMISSION.

Application filed September 27, 1926, Serial No. 137,990, and in Great Britain July 16, 1925.

This invention relates to improvements in electric power transmission and is illustrated, by way of example, in the accompanying drawings, in which,—

Figure 1:
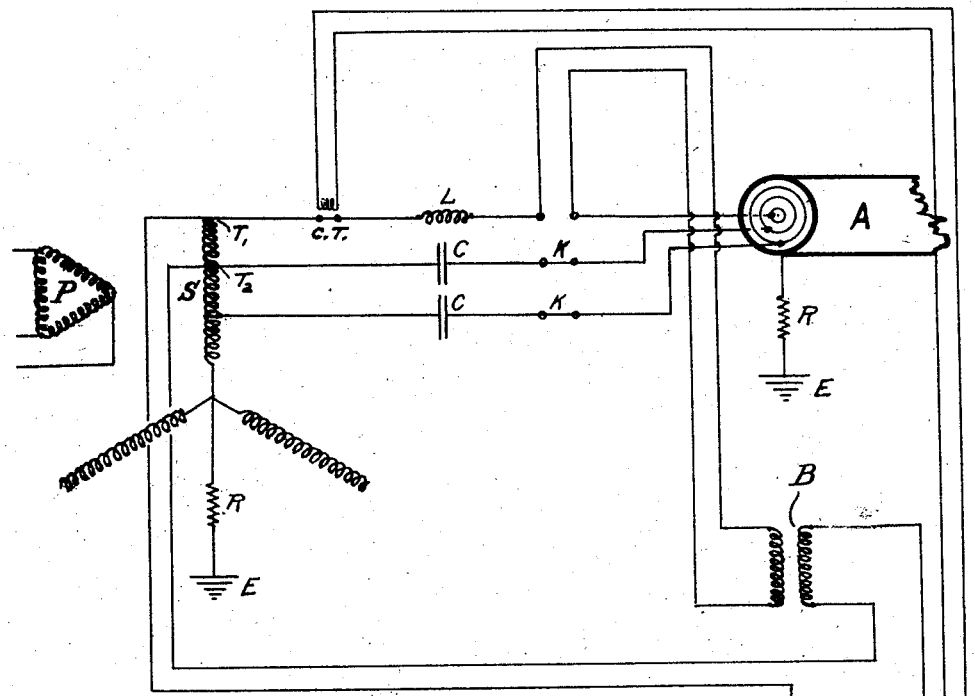
Figure 2:
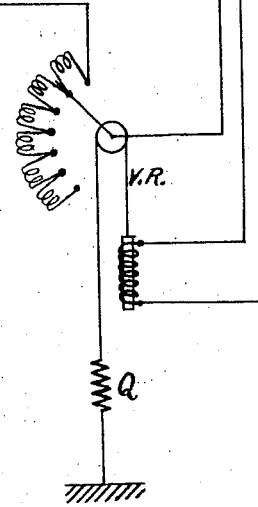
Figure 3:
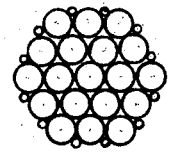

Figure 1 discloses a portion of a transmission system to which the present invention has been applied, Figure 2 discloses a concentric cored cable according to the present invention, and Figure 3 shows a central core of such a cable of slightly modified form.

In electric transmission of power systems, in which very high powers have to be transmitted with the smallest number of cables possible, it is frequently of great moment to be able to transmit additional power over a given cable.

It has been pointed out by the present inventor that it frequently becomes of importance, in order to cut down the number of cables, to employ the very highest possible voltages (with underground cables), even where the length of transmission is very short—say only 10 to 20 miles provided that the power to be handled is large enough.

The more the number of cables is cut down, by the employment of the higher voltage and the consequently larger power output per cable, the more important does it become to condense the power on the reduced number of cables; because a greater percentage saving in the cost is effected thereby. For instance, if, with a fixed limitation in the voltage and diameter of cable, the amount of power to be transmitted is just a little too large for three cables, we must put down four cables—an excess in the cost of 33%—whereas, if it is just too large for two cables, we must put down three cables—an excess in the cost of 50%.

In the long-distance transmissions contemplated in the present inventor's British Patent No. 232,275, the capacitance current was so supremely important that the carrying capacity of the two intersheaths (triple-concentric cables) was taxed to its limit and no margin was left for the passage of a load current. It did not therefore seem advisable to overburden the intersheaths with a load current.

Moreover, in a long-distance transmission, where the cost of the line bears a much larger proportion to the total cost of the plant, the question of economy under Kelvin's law comes in as well as the percentage voltage loss in the intersheaths, requiring the current density in the intersheaths to be kept down very considerably and thus their contribution to the total power becomes very much less effective than that of the central core; particularly when the much heavier capacitance current required by these intersheaths is added to any load current which it is desired to put through.

An example will perhaps make it clear. If it were practicable to have three cores of equal cross section and to work these all at the same current density, the power transmitted by the cable would be represented by say 200,000 k. w. But if the current densities are lowered so that a constant percentage voltage drop occurs on all three cores, it is reduced to 155,000 k. w. (this figure ignoring capacitance current); the powers transmitted through the three cores being respectively in the relation of 1.00, 0.44, and 0.11 that is in proportion to the square of the voltages on the three cores, which are assumed to be in the proportion of 100, 67 and 33 respectively, to maintain equal potentials across the dielectric between the cores and outer lead sheath of the cable for the present example. Hence the outermost core, for long lines, is almost useless for the transmission of load current, if a constant percentage of drop is to be maintained on all three cores.

Similarly, treating on the basis of Kelvin's law, as enunciated by Woodhouse and assuming that "Q" viz the added cost of the cable per square inch of area (in Woodhouse's formula, set forth and explained in his article "The Distribution of Electricity"—page 90, vol. 59, Journal, Institution of Electrical Engineers, London, December 1920), at the new pressure is, at very high voltages, directly proportional to the voltage (allowing for the rapid increase in the cost of the lead sheath, joints, etc.,), we find that only 173.000 k. w. is transmitted and that the powers transmitted through the three cores are respectively in the relation of 1.00, 0.54 and 0.19, that is in proportion to the three-halves power of the voltages on the three cores which are assumed to be in the same proportion—100, 67 and 33 as in the previous example; these results are arrived at since according to Woodhouse the permissible voltage drops are in the proportion to the square-root of "Q" over "P"—the cost of the losses—which is a constant for all the conductors of the cable and assuming the area and other constants for each core to be equal and the same; therefore in proportion to the square-root of the voltages, which allows for the powers transmitted to be in proportion to the three-halves power of the voltages on the three cores. Here, again, the outermost intersheath is still very ineffective.

The present inventor has, however, pointed out that when we come to quite short lines—10 to 20 miles—neither of the above considerations (voltage drop or cost of lost energy) is of supreme moment; and additional to all this is the fact that the capacitance current to be transmitted is now quite small. Hence there is every inducement to pass load current into the intersheaths, with a view to reducing, so far as possible, the number of cables required for a given power transmission.

The present inventor has also proved that, from the point of view of keeping down the temperature of the central core (the insulation contiguous to which is doubly tested—both electrically and thermally), a distinct advantage can be attained by liberating, in the intermediate and outermost intersheaths, some of the heat which would otherwise be liberated in the central core; since the heat, for example, liberated in the outermost core can get away nearly twice as easily as if it were liberated in the central core. That is, neglecting other considerations, there may be put into the outermost core nearly double the heat ($\sqrt{2}$ times the current) which would otherwise have been considered safe to put into it, even under Kelvin's law; and thus the innermost core is relieved of course to that extent. To a less degree, the same remarks apply also to the intermediate core.

Continuing this development, and taking advantage of the fact that, on a triple-concentric super-tension cable, the intermediate—and in particular the outermost—cores are rendered mechanically flimsy by virtue of their relative thinness, and that to stiffen these cores mechanically would be a very decided advantage and would cost in proportion nothing like that of another cable, the present inventor proposes to avail himself of the position led up to by the above considerations by materially increasing the cross-section of the intermediate and outermost cores as will be the case in the cable illustrated in Figure 2, (still keeping the current density the same); he proposes to make up the necessary variable boost on these cores, where needed—by means of suitable voltage regulators arranged to preserve the proper relations of the capacitance and load currents in the three cores under all conditions of load, and, in particular, to make the transference of heat liberation toward the outermost core more rapid as the load comes on, by means of said regulators; employing also, where needed, inductances or condensers in series with the cores to enable differentiation to be made between the different cores as the load changes. For instance, an inductance inserted in the central core circuit, will introduce a counter E. M. F. or "buck" into the central core, which will automatically increase as the (total) load on the cable increases, and thus deflects load into the outer cores. Or, a condenser traversed by the load current in the other intersheaths will "boost" the load current and so pass current out of the central core into these outer cores.

Under these conditions, the transmitting power of the cable for equal diameter, may be increased to as high as 236,000 k. w.

Not only so, but the cable having been thus greatly stiffened, in the mechanical sense, is now better adapted for bending round the drum without the same tendency for the cross section of the whole cable to take the form of an ellipse; with very great advantage to the avoiding of air pockets in the (paper) insulation.

Again, by the method of transferring the heat from the central core to the outer cores in a rather more rapid ratio than the increase of the (total) load, the central insulation of the cable is better protected against the heating due to (total) loads in excess of the normal for which the cable was designed and therefore a larger margin of overload capacity is secured.

Referring now to Figure 1 of the drawing:—

(A) represents a triple concentric cable, consisting of (1) an innermost core which is connected, through the secondary coil of a static booster (B) and through an inductance (L) and a current transformer (C. T.) with the terminal (T1) of one phase of the secondary coil (S) of the main transformer bank (2) of an intermediate core which may be connected through a link (K) and a condenser (C) with the terminal (T2) of said transformer bank, and (3) of an outermost core similarly connected to a point intermediate between (T2) and the "neutral point" of the said transformer bank.

The said neutral point, which may be also connected with the lead sheath of the cable, is connected to earth through a resistance (R).

The primary coil (P) of the step-up transformer may be delta-connected with the other two phases (not shown).

The voltage regulator (V. R.) consists of (1) an operating coil, shown for simplicity actuating directly an iron core or plunger—though a relay may be interposed before current enters this coil—and (2) of an "inductive" rheostat, or its equivalent, the coils of which are cut out by the operation of the arm of the rotating switch, which is shown, for simplicity, as operating merely by the action of a cord passing once or twice round its spindle and attached, on the left-hand side, to a spring (Q) or a counterweight.

(C. T.) is a current transformer, feeding the operating coil of the voltage regulator with a current which is proportional to the load on the main transformer.

(B) is a static booster, the power for operating the primary, or right-hand, coil of which may be derived from the terminals (T1) (T2) the voltage applied to said primary being cut down, as desired, by the inductive rheostat through the operation of the regulator (V. R.).

By suitably adjusting the voltage applied to the primary of the booster (B), any desired amount of negative boost (or "buck") may be introduced into the central core of the cable; i. e. the introduction of negative voltage may easily be caused to drive current out of the central core of the cable to any desired extent.

The same object as is covered by the drawing—namely to get a voltage applied to the regulator coil which is in direct proportion to the load upon the main transformer—may be effected by putting the primary of a current transformer in series with the main lead from the generator to the low-tension primary coil of the main transformer and running the two wires from the secondary of the said current transformer to the coil of the voltage regulator. The advantages of this arrangement would be that it would not be necessary to touch the extremely high pressure circuit and thereby expense, and danger of breakdown, would be avoided.

Working on the same line of thought, it is obvious that the alternating pressure for operating the primary, or right-hand, coil of the static booster may just as well be taken from the two ends of the primary coil of the main transformer; and thereby the expense of connecting up with the especially high tension circuit, and the danger of breakdown, may be avoided.

As stated, the current may be caused to pass out of the central core of the cable as the load comes on to the cable by an inductance inserted between the transformer and the central core of the cable. By the arrangement shown in Figures 2 and 3, however, the self-induction of the central core itself is increased continuously throughout its length with the result in part or in toto to make unnecessary the employment of an auxiliary inductance coil.

In addition to this another auxiliary advantage which may prove to be of some moment is obtained in that the surface of the central core contains less accentuated projections likely to form corona, or to effect ionization of the impregnated paper next to the copper core.

The method by which I effect the above result is to take a number of strands, each strand consisting of say either three, or seven, iron wires, and cause these strands to be laid into the grooves formed between successive conductors round the circumference of the copper core of the cable. These iron strands, or wires, are represented by the smaller circles in Figures 2 and 3.

For instance, supposing that the copper core was a 7-strand core (Figure 2), having one centre copper wire and 6 others laid round same, in this case there would be six small strands laid in each of the six grooves so obtaining upon the surface of the copper core. If the copper core contains 19 strands (7 + 12), then 12 fine iron wire strands would be laid round the circle. In this case the strands would probably consist of at least three small wires, and the gauge of the iron wires, would in all cases be as fine as practically possible in order to avoid eddy-currents in the same.

In the case of the cable having only 7 copper strands (which form would generally be preferred) there would be more room for the iron wire strands and a larger strand, i. e. a strand containing more fine wires, might be employed.

By thus filling up the valleys between successive copper wires, the stresses in the dielectric are reduced.

Figure 2 shows an example, in cross-section, of a triple-concentric cored cable in accordance with the principles of this invention. It will be noted that the central core comprises seven stranded copper wires with iron wires in the interstices in the outer periphery. The intermediate core comprises 18 copper wires,—more than double the core section of the central core,—and the outer concentric core has 30 copper wires,— or more than four times the core area of the central core. The cores may be insulated in the customary manner and an outer casing, or lead sheath used to enclose the cable.

It will be understood that the above invention is equally applicable to quarter-phase, or two-phase, transmission, on the lines of my British Patent No. 236.759, as it is to three-phase transmission (British Patent No. 232,275).

Having now particularly described and ascertained the nature of my said invention and in what manner the same is to be performed, I declare that what I claim is:—

1. In a high-tension alternating-current transmission system, the combination of a cable comprising concentric insulated conducting cores, means to transmit current through the cable, and means to increase the proportion of the current carried by the outer core or cores with the increase of load on the cable.

2. In a high-tension alternating-current transmission system, the combination of a cable comprising concentric insulated conducting cores in which the outer core or cores have an increased cross-section above that of the central core whereby the cable has an increased current carrying capacity, means to transmit current through the cable, and means to increase the proportion of the current carried by the outer core or cores with the increase of load on the cable.

3. In a high-tension alternating-current transmission system, the combination of a cable comprising concentric insulated conducting cores, means to transmit current through the cable, and means to increase the proportion of the current carried by the outer core or cores with the increase of load on the cable in a more rapid proportion than in proportion to the increase of the total load on the cable.

4. In a high-tension alternating-current transmission system, the combination of a cable comprising concentric insulated conducting cores, means to transmit current through the cable, and regulators arranged to inject a gradually-increasing "boost" into the outer core or cores to increase the proportion of the current carried by the outer core or cores with the increase of load on the cable.

5. In a high-tension alternating-current transmission system, the combination of a cable comprising concentric insulated conducting cores, and means to transmit current through the cable, and means to produce a variable "buck" in the circuit of the central core, which, as the load current in the central core rises automatically inserts more counter E. M. F. in the circuit of said central core and diverts the load current into the outer core or cores to increase the proportion of the current carried by the outer core or cores with the increase of load on the cable.

6. In a high-tension, alternating-current transmission system, the combination of a cable comprising concentric insulated conducting cores, means to transmit current through the cable, and means to produce a variable "boost" in an outer core of the cable, which, as the load current in the outer core rises automatically inserts a boost in the circuits of said core and diverts load current into them to increase the proportion of the current carried by the outer core with the increase of the load on the cable.

7. In a high-tension alternating-current transmission system, the combination of a cable comprising concentric insulated conducting cores, means to transmit current through the cable, and means to produce a variable "buck" in the circuit of the central core and a variable "boost" in the circuit of the outer core or either or each of the outer cores cooperating to divert load current into the outer core or cores to increase the proportion of the current carried by the outer core or cores with the increase of the load on the cable.

8. In a high-tension alternating-current transmission system, the combination of a cable comprising concentric insulated conducting cores, means to transmit current through the cable, and means including an inductance in the central core comprising iron wires surrounding the central core and extending along its length, which, as the load current in the central core rises (due to increasing load on the cable) automatically generates a greater counter E. M. F. in the core and thereby diverts load current therefrom to increase the proportion of the current carried by the outer core or cores with the increase of the load on the cable.

In testimony whereof he affixes his signature.

ALFRED MILLS TAYLOR.